United States Patent
Mahan et al.

(10) Patent No.: US 9,616,348 B2
(45) Date of Patent: Apr. 11, 2017

(54) SYSTEM AND METHOD OF PROVIDING LEADERBOARDS FOR MOBILE GAMING IN A WIRELESS NETWORK

(75) Inventors: Michael P. Mahan, San Diego, CA (US); David M. Minch, West Linn, OR (US)

(73) Assignee: QUALCOMM Incorporated, San Diego, CA (US)

( * ) Notice: Subject to any disclaimer, the term of this patent is extended or adjusted under 35 U.S.C. 154(b) by 114 days.

(21) Appl. No.: 12/875,242

(22) Filed: Sep. 3, 2010

(65) Prior Publication Data
US 2011/0065511 A1 Mar. 17, 2011

Related U.S. Application Data

(60) Provisional application No. 61/241,862, filed on Sep. 11, 2009.

(51) Int. Cl.
| | | |
|---|---|---|
| *A63F 9/24* | (2006.01) | |
| *A63F 13/00* | (2014.01) | |
| *G06F 17/00* | (2006.01) | |
| *G06F 19/00* | (2011.01) | |
| *A63F 13/85* | (2014.01) | |

(Continued)

(52) U.S. Cl.
CPC ............ *A63F 13/85* (2014.09); *A63F 13/332* (2014.09); *A63F 13/798* (2014.09); *A63F 2300/406* (2013.01); *A63F 2300/558* (2013.01); *A63F 2300/61* (2013.01)

(58) Field of Classification Search
CPC .......................... A63F 2300/61; A63F 2300/60
USPC ...................................................... 463/40, 42
See application file for complete search history.

(56) References Cited

U.S. PATENT DOCUMENTS

| | | | | |
|---|---|---|---|---|
| 5,971,849 A | * | 10/1999 | Falciglia | 463/16 |
| 6,082,887 A | * | 7/2000 | Feuer et al. | 700/91 |
| 7,819,749 B1 | * | 10/2010 | Fish et al. | 463/42 |

(Continued)

FOREIGN PATENT DOCUMENTS

| | | |
|---|---|---|
| CN | 1894010 A | 1/2007 |
| EP | 1738810 A1 | 1/2007 |

(Continued)

OTHER PUBLICATIONS

National Information Standards Organization, Understanding Metadata (2004) ("NISO").*

(Continued)

*Primary Examiner* — Milap Shah
*Assistant Examiner* — Jason Pinheiro
(74) *Attorney, Agent, or Firm* — Shirin Tefagh

(57) ABSTRACT

A method of receiving a leaderboard associated with a software game executed at a wireless device is provided. The method includes monitoring at least one metric associated with the software game while the software game is played. The method further includes collecting a value of the at least one metric when the game is over and comparing the value of the at least one metric to a device leaderboard. The method additionally includes transmitting the value of the at least one metric to a game server when the value of the at least one metric is a best value when compared to the device leaderboard. The device leaderboard may indicate a ranking of scores achieved by playing the software game at the wireless device in which the software game is executed.

23 Claims, 8 Drawing Sheets

(51) Int. Cl.
*A63F 13/798* (2014.01)
*A63F 13/332* (2014.01)

(56) References Cited

U.S. PATENT DOCUMENTS

| | | | |
|---|---|---|---|
| 7,828,661 B1* | 11/2010 | Fish et al. | 463/42 |
| RE45,040 E* | 7/2014 | Fish et al. | 463/42 |
| 2006/0089200 A1* | 4/2006 | Twerdahl | 463/42 |
| 2007/0174490 A1* | 7/2007 | Choi et al. | 709/246 |
| 2008/0113805 A1 | 5/2008 | David et al. | |
| 2008/0280685 A1 | 11/2008 | Hansen et al. | |
| 2009/0176557 A1 | 7/2009 | Hall et al. | |

FOREIGN PATENT DOCUMENTS

| | | |
|---|---|---|
| JP | 2000157724 A | 6/2000 |
| JP | 2004358059 A | 12/2004 |
| JP | 2007244651 A | 9/2007 |
| JP | 2008245712 A | 10/2008 |
| TW | 200711692 A | 4/2007 |

OTHER PUBLICATIONS

IGN, GOLO Golf Dice, http://www.ign.com/games/golo-golf-dice/web-868341 (Jul. 6, 2006).*
Frenzic Frequently Asked Questions, https://web.archive.org/web/20080108091241/http://frenzic.com/faq/ (Jan. 8, 2008).*
WildTangent, Fate—Explore the Undiscovered Realms Contest Official Rules, http://games.wildtangent.com/fate/fateur/fateexploreur.html (2008).*
International Search Report and Written Opinion—PCT/US2010/048005, International Search Authority—European Patent Office—Dec. 22, 2010.
Caduceus, New Blood, Official Guide Book, Atlus Co., Ltd., Feb. 12, 2008, First printing, p. 9.

* cited by examiner

SYSTEM AND METHOD OF PROVIDING LEADERBOARDS FOR MOBILE GAMING IN A WIRELESS NETWORK

CLAIM OF PRIORITY UNDER 35 U.S.C. §119

The present application for patent claims priority to Provisional Application No. 61/241,862 entitled "SYSTEM AND METHOD OF PROVIDING LEADERBOARDS FOR MOBILE GAMING IN A WIRELESS NETWORK" filed Sep. 11, 2009, and assigned to the assignee hereof and hereby expressly incorporated by reference herein.

COPYRIGHT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The present teachings relate to the operation of data networks, and more particularly, to systems and methods for providing leaderboards for mobile gaming in wireless networks.

Advances in technology have resulted in the development and deployment of extensive data networks. These networks include both public data networks, such as the Internet, and specialized networks, such as wireless telecommunication networks. Users of these networks have the ability to access a wide variety of information and services that are available as network resources.

One example where there is an increasing demand for network resources is in wireless network environments. In wireless environments, a variety of wireless devices, such as wireless telephones, personal digital assistants (PDAs), and paging devices, communicate over a wireless network. The wireless network may also include network servers that operate to provide various network resources to the wireless devices. Furthermore, the wireless networks may also be coupled to a public network, such as the Internet, so that resources on the public network can be made available to the wireless devices on the wireless network.

One use of wireless devices includes playing electronic games. A user can download a software game to a wireless device and play the game at the wireless device. The user can play alone, head-to-head, or in groups. A user can compare his or her score to previous scores obtained by the user at the wireless device or other players scores obtained while playing the game at the same wireless device.

Therefore, what is needed is a system and method that operates to provide leaderboards for mobile gaming in a wireless network.

SUMMARY OF THE DISCLOSURE

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A method of receiving a leaderboard associated with a software game executed at a wireless device is disclosed. The method includes monitoring at least one metric associated with the software game while the software game is played. The method further includes collecting a value of the at least one metric when the game is over and comparing the value of the at least one metric to a device leaderboard. The method further includes transmitting the value of the at least one metric to a game server when the value of the at least one metric is a best value when compared to the device leaderboard. The device leaderboard may indicate a ranking of scores achieved by playing the software game at the wireless device in which the software game is executed.

In this aspect, the method may further include receiving a global leaderboard from the game server. The global leaderboard may indicate a ranking of scores achieved by a plurality of global users playing the software game provided by the game server. Moreover, the global leaderboard may indicate a top ten ranking of scores received from a plurality of global users playing the software game provided by the game server. The global leaderboard may also indicate a ranking of the best value received from the wireless device when the best value received from the wireless device is not in the top ten ranking of scores. In this aspect, the at least one metric is selected from the group comprising a game score, a time to complete a level, a time to finish the game, a character strength, a number of kills, a number of objectives achieved, an amount of money earned, or a combination thereof.

In another aspect, a wireless device for receiving a leaderboard associated with a software game executed at the wireless device is disclosed. The wireless device may include means for monitoring at least one metric associated with the software game while the software game is played. The wireless device may further include means for collecting a value of the at least one metric when the game is over and means for comparing the value of the at least one metric to a device leaderboard. The method further includes means for transmitting the value of the at least one metric to a game server when the value of the at least one metric is a best value when compared to the device leaderboard. The device leaderboard may indicate a ranking of scores achieved by playing the software game at the wireless device in which the software game is executed.

In this aspect, the wireless device may include means for receiving a global leaderboard from the game server. The global leaderboard may indicate a ranking of scores achieved by a plurality of global users playing the software game provided by the game server. Moreover, the global leaderboard may indicate a top ten ranking of scores received from a plurality of global users playing the software game provided by the game server. The global leaderboard may also indicate a ranking of the best value received from the wireless device when the best value received from the wireless device is not in the top ten ranking of scores. In this aspect, the at least one metric may be selected from the group comprising a game score, a time to complete a level, a time to finish the game, a character strength, a number of kills, a number of objectives achieved, an amount of money earned, or a combination thereof.

In still another aspect, a wireless device for receiving a leaderboard associated with a software game executed at the wireless device is disclosed and may include a processor. The processor may be operable to monitor at least one metric associated with the software game while the software game is played. The processor may be operable to collect a value of the at least one metric when the game is over. The processor may further be operable to compare the value of the at least one metric to a device leaderboard and to transmit the value of the at least one metric to a game server when the value of the at least one metric is a best value when compared to the device leaderboard. The device leaderboard may indicate a ranking of scores achieved by playing the software game at the wireless device in which the software game is executed.

In this aspect, the processor may also be operable to receive a global leaderboard from the game server. The global leaderboard may indicate a ranking of scores achieved by a plurality of global users playing the software game provided by the game server. The global leaderboard may also indicate a top ten ranking of scores received from a plurality of global users playing the software game provided by the game server. Additionally, the global leaderboard may indicate a ranking of the best value received from the wireless device when the best value received from the wireless device is not in the top ten ranking of scores. The at least one metric may be selected from the group comprising a game score, a time to complete a level, a time to finish the game, a character strength, a number of kills, a number of objectives achieved, an amount of money earned, or a combination thereof.

In yet another aspect, a computer program product is disclosed and may include a computer-readable medium. The computer-readable medium may include at least one instruction for causing a computer to monitor at least one metric associated with the software game while the software game is played. The computer-readable may further include at least one instruction for causing the computer to collect a value of the at least one metric when the game is over. The computer-readable medium may additionally include at least one instruction for causing the computer to compare the value of the at least one metric to a device leaderboard and at least one instruction for causing the computer to transmit the value of the at least one metric to a game server when the value of the at least one metric is a best value when compared to the device leaderboard. The device leaderboard may indicate a ranking of scores achieved by playing the software game at the wireless device in which the software game is executed.

In this aspect, the computer-readable medium may also include at least one instruction for causing the computer to receive a global leaderboard from the game server. The global leaderboard may indicate a ranking of scores achieved by a plurality of global users playing the software game provided by the game server. Moreover, the global leaderboard may indicate a top ten ranking of scores received from a plurality of global users playing the software game provided by the game server. The global leaderboard may also indicate a ranking of the best value received from the wireless device when the best value received from the wireless device is not in the top ten ranking of scores. The at least one metric may be selected from the group comprising a game score, a time to complete a level, a time to finish the game, a character strength, a number of kills, a number of objectives achieved, an amount of money earned, or a combination thereof.

In another aspect, a method of providing a global leaderboard associated with a software game executed at least one wireless device is disclosed. The method may include receiving a value of at least one metric from the at least one wireless device. The method may further include comparing the value of the at least one metric to the global leaderboard and indicating a ranking of the value of the at least one metric at least partially based on the global leaderboard. Further, the method may include storing the value of the at least one metric within the global leaderboard and transmitting a new global leaderboard to the wireless device with a global ranking at least partially based on all wireless devices associated with the software game.

In this aspect, the new global leaderboard may indicate whether the value of the at least one metric is a best value. The new global leaderboard may also indicate whether the value of the at least one metric is a top ten value. Further, the new global leaderboard may indicate a top ten ranking of all wireless devices associated with the software game and a ranking of the value of the at least one metric when the value of the at least one metric is not in the top ten. The at least one metric may be selected from the group comprising a game score, a time to complete a level, a time to finish the game, a character strength, a number of kills, a number of objectives achieved, an amount of money earned, or a combination thereof.

In still another aspect, a server for providing a global leaderboard associated with a software game executed at least one wireless device is disclosed. The server may include means for receiving a value of at least one metric from the at least one wireless device. The server may further include means for comparing the value of the at least one metric to the global leaderboard and means for indicating a ranking of the value of the at least one metric at least partially based on the global leaderboard. The server may also include means for storing the value of the at least one metric within the global leaderboard and means for transmitting a new global leaderboard to the wireless device with a global ranking at least partially based on all wireless devices associated with the software game.

In this aspect, the new global leaderboard may indicate whether the value of the at least one metric is a best value. The new global leaderboard may also indicate whether the value of the at least one metric is a top ten value. Further, the new global leaderboard may indicate a top ten ranking of all wireless devices associated with the software game and a ranking of the value of the at least one metric when the value of the at least one metric is not in the top ten. The at least one metric may be selected from the group comprising a game score, a time to complete a level, a time to finish the game, a character strength, a number of kills, a number of objectives achieved, an amount of money earned, or a combination thereof.

In yet another aspect, a server for providing a global leaderboard associated with a software game executed at least one wireless device is disclosed and may include a processor. The processor may be operable to receive a value of at least one metric from the at least one wireless device. The processor may further be operable to compare the value of the at least one metric to the global leaderboard and to indicate a ranking of the value of the at least one metric at least partially based on the global leaderboard. Moreover, the processor may be operable to store the value of the at least one metric within the global leaderboard and to transmit a new global leaderboard to the wireless device with a global ranking at least partially based on all wireless devices associated with the software game.

In this aspect, the new global leaderboard may indicate whether the value of the at least one metric is a best value. The new global leaderboard may also indicate whether the value of the at least one metric is a top ten value. Additionally, the new global leaderboard may indicate a top ten ranking of all wireless devices associated with the software game and a ranking of the value of the at least one metric when the value of the at least one metric is not in the top ten. The at least one metric may be selected from the group comprising a game score, a time to complete a level, a time to finish the game, a character strength, a number of kills, a number of objectives achieved, an amount of money earned, or a combination thereof.

In another aspect, a computer program product is disclosed and may include a computer-readable medium. The computer-readable medium may include at least one instruction for causing a computer to receive a value of at least one metric from the at least one wireless device. The computer-readable medium may further include at least one instruction for comparing the value of the at least one metric to the global leaderboard and at least one instruction for causing the computer to indicate a ranking of the value of the at least one metric at least partially based on the global leaderboard. The computer-readable medium may also include at least one instruction for causing the computer to store the value of the at least one metric within the global leaderboard and at least one instruction for transmitting a new global leaderboard to the wireless device with a global ranking at least partially based on all wireless devices associated with the software game.

In this aspect, the new global leaderboard may indicate whether the value of the at least one metric is a best value. Further, the new global leaderboard may indicate whether the value of the at least one metric is a top ten value. The new global leaderboard may also indicate a top ten ranking of all wireless devices associated with the software game and a ranking of the value of the at least one metric when the value of the at least one metric is not in the top ten. The least one metric may be selected from the group comprising a game score, a time to complete a level, a time to finish the game, a character strength, a number of kills, a number of objectives achieved, an amount of money earned, or a combination thereof.

To the accomplishment of the foregoing and related ends, the one or more aspects comprise the features hereinafter described in detail and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects. In the figures, like reference numerals refer to like parts throughout the various views unless otherwise indicated.

DETAILED DESCRIPTION

Various aspects of the disclosure are further described below. It should be apparent that the teaching herein can be embodied in a wide variety of forms and that any specific structure or function disclosed herein is merely representative. Based on the teachings herein one skilled in the art should appreciate that an aspect disclosed herein can be implemented independently of other aspects and that two or more of these aspects can be combined in various ways. For example, an apparatus can be implemented or a method practiced using any number of the aspects set forth herein. In addition, an apparatus can be implemented or a method practiced using other structure or functionality in addition to or other than one or more of the aspects set forth herein.

In the subject disclosure, the word "exemplary" is used to mean "serving as an example, instance, or illustration." Any aspect described herein as "exemplary" is not necessarily to be construed as preferred or advantageous over other aspects. Rather, use of the word exemplary is intended to present concepts in a concrete fashion. Furthermore, as used in this application and the appended claims, the term "or" is intended to mean an inclusive "or" rather than an exclusive "or." That is, unless specified otherwise, or clear from context, "X employs A or B" is intended to mean any of the natural inclusive permutations. That is, in this example, X could employ A, or X could employ B, or X could employ both A and B, and thus the statement "X employs A or B" is satisfied under any of the foregoing instances. In addition, the articles "a" and "an" as used in this application and the appended claims should generally be construed to mean "one or more" unless specified otherwise or clear from context to be directed to a singular form.

In this description, the term "application" may also include files having executable content, such as object code, scripts, byte code, markup language files, and patches. In addition, an "application" referred to herein, may also include files that are not executable in nature, such as documents that may need to be opened or other data files that need to be accessed.

The term "content" may also include files having executable content, such as object code, scripts, byte code, markup language files, and patches. In addition, an "content" referred to herein, may also include files that are not executable in nature, such as documents that may need to be opened or other data files that need to be accessed.

In this description, the terms "communication device," "wireless device," "wireless telephone," "wireless communications device," and "wireless handset" are used interchangeably. With the advent of third generation (3G) wireless technology, more bandwidth availability has enabled more electronic devices with wireless capabilities. Therefore, a wireless device could be a cellular telephone, a pager, a PDA, a smartphone, a navigation device, or a computer with a wireless connection.

Figure 1:
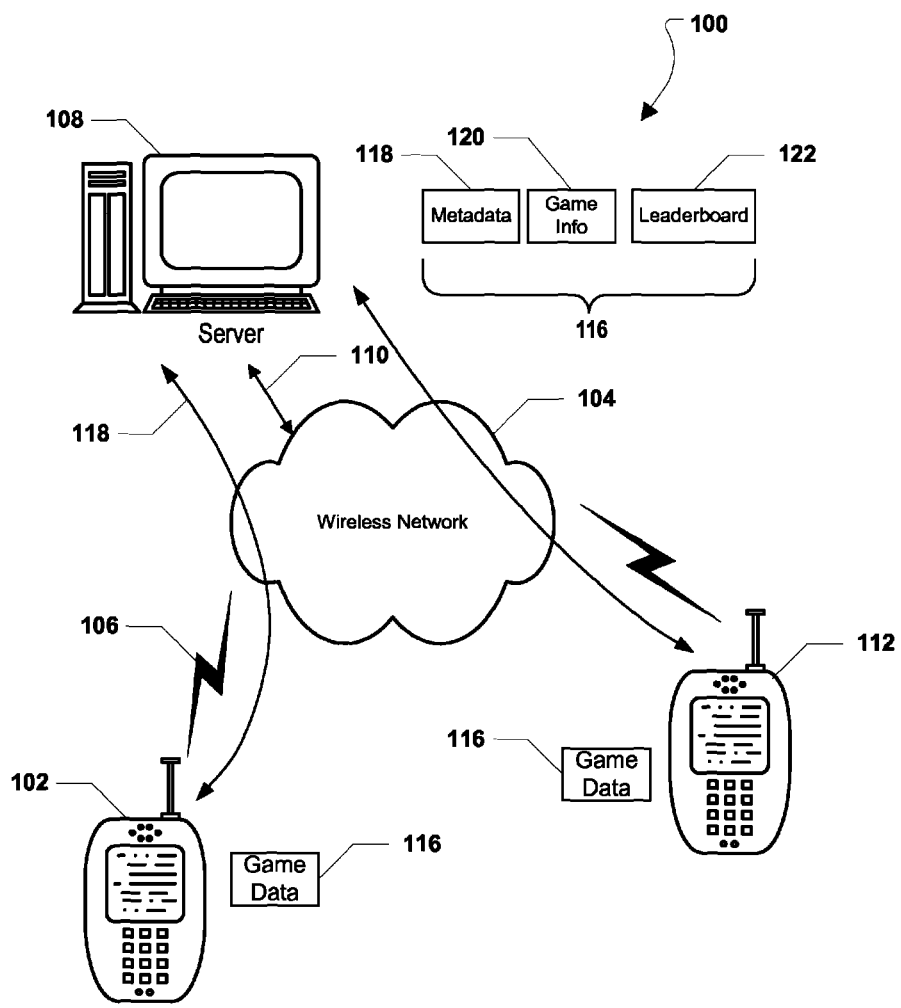
FIG. 1 is a diagram of a data network, according to one aspect.

FIG. 1 shows a data network 100, according to one aspect. The network 100 may include a first wireless device 102 that communicates with a wireless data network 104 via a wireless communication channel 106. The network 100 may also include a server 108 that operates to provide services to the first wireless device 102 and other entities in communication with the network 104. The server 108 may be coupled to the network 104 by link 110, which may be any type of wired or wireless link. For example, in one aspect, the wireless device 102 may be a wireless telephone, and the server 108 may be part of a nationwide telecommunications network that provides applications and/or multimedia content to the device 102. A second wireless device 112 may also be coupled to the network 104.

In one aspect, the server 108 may transmit and receive, game data 116 to and from the first wireless device 102, the second wireless device 112, or a combination thereof. The game data 116 may include user metadata 118, game information 120, and a leaderboard 122. In a particular aspect, the server 108 may transmit the game data 116 to a wireless device 102, 108. Based on the game data 116, a user may play a particular game at a wireless device 102, 108. During, or after, game play, the wireless device 102, 108 may transmit game data 116 back to the server 108. For example, the wireless device 102, 108 may transmit metadata 118 to the server 108. The metadata 118 can include a username associated with the wireless device 102, 108. Further, the metadata 118 may include specific game data associated with the username, e.g., a character name, character configuration data, high score, time to complete a particular level, time to win a game, time to reach a particular score, etc. Based on the metadata 118, the server 108 can create a leaderboard 122 of all players, or registered players, of a particular game. Thereafter, the server 108 can transmit the leaderboard 122 back to the wireless device 102, 108. A user can use the leaderboard 122 to gauge his or her prowess with a particular game based on other users' game information.

Figure 2:
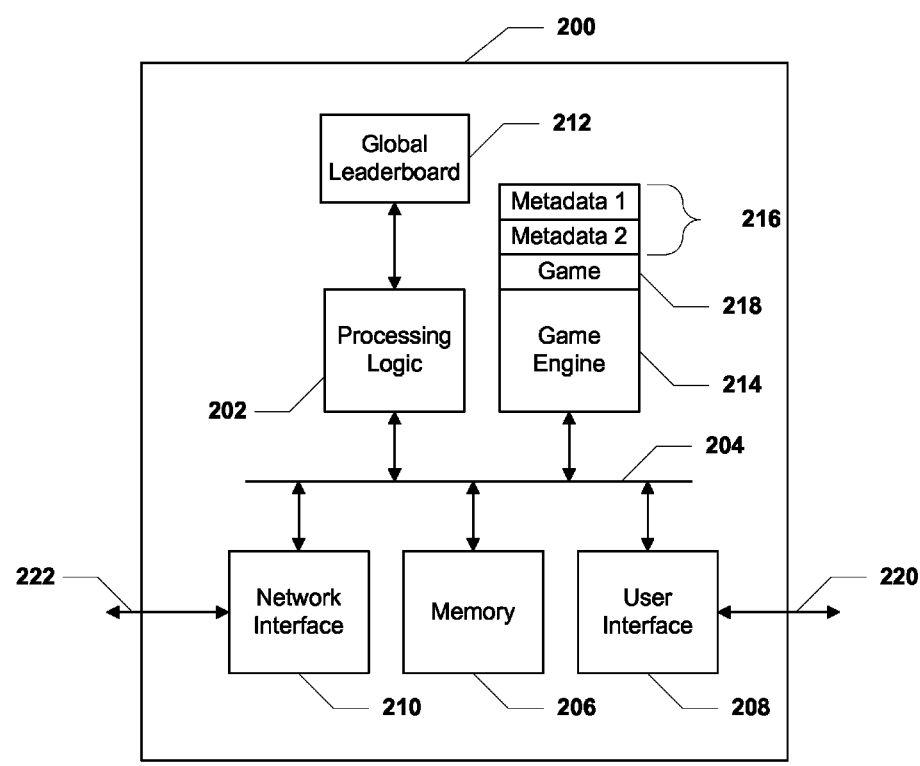
FIG. 2 is a diagram of a game server, according to one aspect.

FIG. 2 shows a functional block diagram illustrating one aspect of a server 200 that is operable to deliver streaming content to one or more wireless devices over a wireless data network. As depicted in FIG. 2, the server 200 may include processing logic 202 that is coupled to an internal data bus 204. Also coupled to the internal data bus 204 are a memory 206, a user interface 208, and a network interface 210. The server 200 may also include a global leaderboard 212 that may be accessible to the processing logic 202 and an application memory 214 coupled to the internal bus 204. The server 200 may further include a game engine 214 coupled to the internal data bus 204. The game engine 214 may be an application stored in a memory that may be executed by the processing logic 202. The game engine 214 and the processing logic 202 may be operable to execute one or more of the method operations described herein. One or more of the method operations may be stored as instructions, e.g., within the memory 206. The game engine 214 may include metadata 216 associated with one or more users, or players, of a game, or games, that are downloaded to one or more wireless devices. Further, the game engine 214 may include game data 218. The game data 218 may include the software associated with a particular game. Further, the game engine 214 can use the metadata 216 and the game data 218 to create the global leaderboard 212. The global leaderboard 212 can be a dynamic table, or listing, that indicates various metrics associated with a particular game. For example, the global leaderboard 212 can list high scores, fastest times to reach particular scores, fastest times to clear particular levels, fastest times to win particular games, high strength levels, etc.

In one or more aspects, the processing logic 202 comprises a CPU, a gate array, hardware logic, software, or a combination of hardware and software. Thus, the processing logic 202 may generally include logic to execute machine-readable instructions. In other words, the processing logic 202 may act as a means for executing one or more computer programs that may include the method operations disclosed herein.

The memory 206 may include random access memory (RAM), read only memory (ROM), flash memory, electrically erasable read only memory (EEROM), or any other suitable type of memory, or a combination thereof. In one aspect, the memory 206 is located internally to the server 200. In another aspect, the memory 206 comprises a removable memory card or memory device that may be selectively attached to the server 200 and thereby being coupled to the internal bus 204. Thus, the memory 206 may comprise virtually any type of memory that is capable of storing instructions that may be executed by the processing logic 202.

The user interface 208 may receive user input 220, for example, from a keypad, a pointing device, a touch pad, or any other input mechanisms which allow a user to interact with a wireless device. The user interface 208 may also be coupled to a display device, such as a cathode ray tube (CRT) display, a liquid crystal display (LCD), a light emitting diode (LED), or any other type of display device to provide a visual display to the user. Any other type of input or output device may also be coupled to the user interface 208, such as, disk storage, audio logic, video devices, etc.

The network interface 210 operates to transmit and receive information between the server 200 and external devices, systems, and/or networks using a communication link 222. For example, in one aspect, the network interface 210 comprises a radio transceiver circuit (not shown) that operates to transmit and receive information over a wireless data network using the communication link 222. For example, the communication link 222 may be the communication link 106 shown in FIG. 1. For example, the transceiver comprises circuitry that modulates information received from the processing logic 202 and converts the modulated information into high frequency signals suitable for wireless transmission. Similarly, the transceiver also comprises circuitry to convert received high frequency communication signals into signals suitable for demodulation and subsequent processing by the processing logic 202.

In another aspect, the network interface 210 comprises a transceiver that operates to transmit and receive information over a hardwired communication link, such as a telephone line, or other type of data line, to communicate with a remote system on a public data network, such as the Internet.

In still another aspect, the network interface 210 comprises circuitry that operates to communicate with local devices, such as a local workstation. The network interface 210 may also include circuitry (such as serial or parallel port logic) to communicate with a printer or other local computer or device, such as a floppy disk or a memory card. Thus, the network interface 210 may comprise any type of hardware, software, or combination thereof to allow the server 200 to communicate with other local or remotely located devices or systems.

In one aspect, the server 200 may transmit, or otherwise download, game data 218 to one or more wireless devices via the network interface 210. Along with the game data 218, the server 200 may transmit the global leaderboard 212 to the wireless devices. The global leaderboard 212 may be generated by the game engine 214 based on metadata 216 received from one or more players of a particular game, or games.

During operation of the server 200, the processing logic 202 may execute program instructions stored in the memory 206 to perform the functions described herein. For example, in one aspect, the server 200 may perform the described functions when the processing logic 202 executes program instructions stored in the memory 206. In another aspect, the program instructions are stored on a computer-readable medium, such as a floppy disk, a compact disc (CD), a memory card, a flash memory device, a ROM, or any other type of memory device. The program instructions may be loaded into the memory 206 via the network interface 210. For example, the server 200 may download the program instructions from the computer-readable medium into the memory 206 via the network interface 210.

Figure 3:
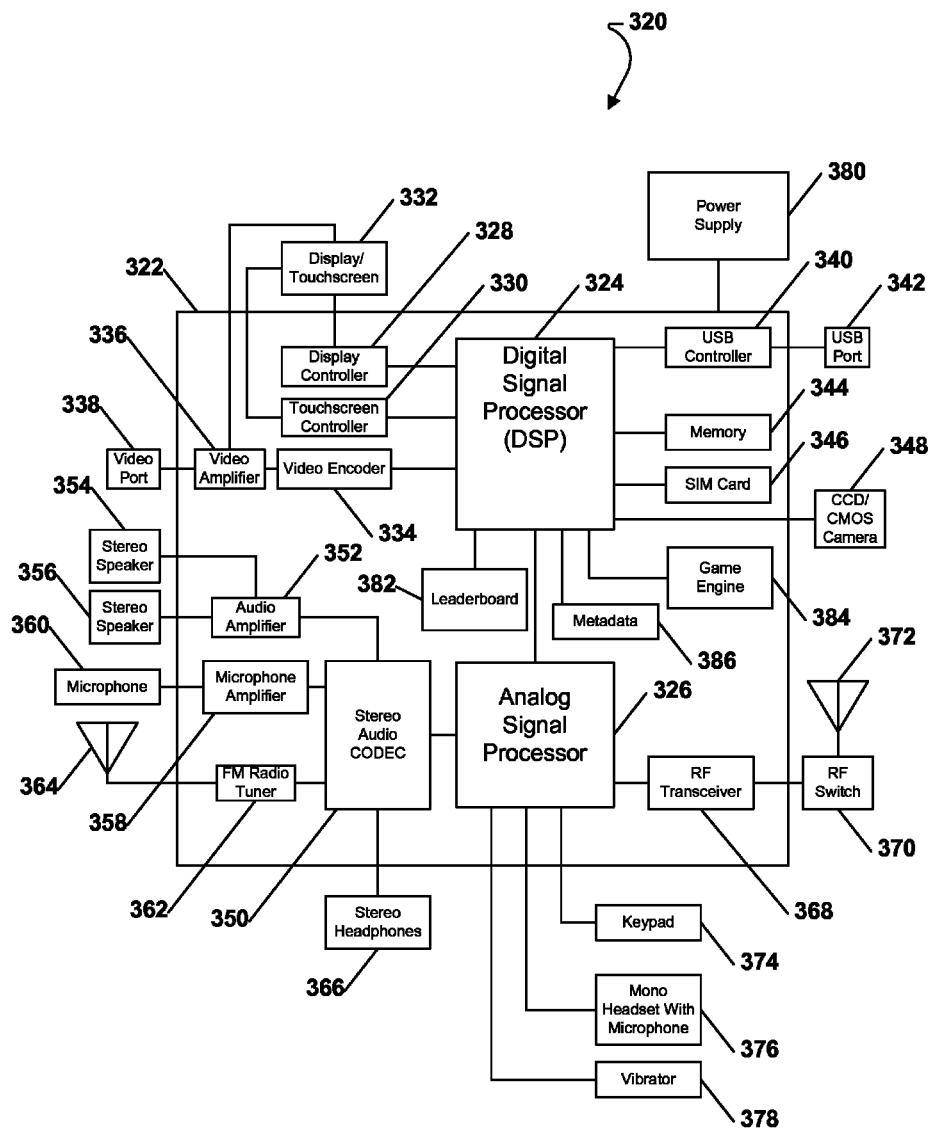
FIG. 3 is a diagram of a telephone, according to one aspect.

Referring to FIG. 3, an exemplary, non-limiting aspect of a wireless telephone is shown and is generally designated 320. As shown, the wireless device 320 includes an on-chip system 322 that includes a digital signal processor 324 and an analog signal processor 326 that are coupled together. As illustrated in FIG. 3, a display controller 328 and a touchscreen controller 330 are coupled to the digital signal processor 324. In turn, a touchscreen display 332 external to the on-chip system 322 is coupled to the display controller 328 and the touchscreen controller 330.

FIG. 3 further indicates that a video encoder 334, e.g., a phase alternating line (PAL) encoder, a sequential couleur a memoire (SECAM) encoder, or a national television system (s) committee (NTSC) encoder, is coupled to the digital signal processor 324. Further, a video amplifier 336 is coupled to the video encoder 334 and the touchscreen display 332. Also, a video port 338 is coupled to the video amplifier 336. As depicted in FIG. 3, a universal serial bus (USB) controller 340 is coupled to the digital signal processor 324. Also, a USB port 342 is coupled to the USB controller 340. A memory 344 and a subscriber identity module (SIM) card 346 can also be coupled to the digital signal processor 324. Further, as shown in FIG. 3, a digital camera 348 can be coupled to the digital signal processor 324. In an exemplary aspect, the digital camera 348 is a charge-coupled device (CCD) camera or a complementary metal-oxide semiconductor (CMOS) camera.

As further illustrated in FIG. 3, a stereo audio CODEC 350 can be coupled to the analog signal processor 326. Moreover, an audio amplifier 352 can coupled to the stereo audio CODEC 350. In an exemplary aspect, a first stereo speaker 354 and a second stereo speaker 356 are coupled to the audio amplifier 352. FIG. 3 shows that a microphone amplifier 358 can be also coupled to the stereo audio CODEC 350. Additionally, a microphone 360 can be coupled to the microphone amplifier 358. In a particular aspect, a frequency modulation (FM) radio tuner 362 can be coupled to the stereo audio CODEC 350. Also, an FM antenna 364 is coupled to the FM radio tuner 362. Further, stereo headphones 366 can be coupled to the stereo audio CODEC 350.

FIG. 3 further indicates that a radio frequency (RF) transceiver 368 can be coupled to the analog signal processor 326. An RF switch 370 can be coupled to the RF transceiver 368 and an RF antenna 372. As shown in FIG. 3, a keypad 374 can be coupled to the analog signal processor 326. Also, a mono headset with a microphone 376 can be coupled to the analog signal processor 326. Further, a vibrator device 378 can be coupled to the analog signal processor 326. FIG. 3 also shows that a power supply 380 can be coupled to the on-chip system 322. In a particular aspect, the power supply 380 is a direct current (DC) power supply that provides power to the various components of the wireless device 320 that require power. Further, in a particular aspect, the power supply is a rechargeable DC battery or a DC power supply that is derived from an alternating current (AC) to DC transformer that is connected to an AC power source.

FIG. 3 also shows that the wireless device 320 can also include a leaderboard 382. The leaderboard 382 can be similar to the leaderboard described above in conjunction with FIG. 1 and FIG. 2. Appendix I lists code associated with an exemplary, non-limiting aspect of a leaderboard.

A user of the wireless device 320 can use the leaderboard 382 to see high scores, etc. associated with a particular game. FIG. 3 indicates that the wireless device 320 can also include game engine 384. The game engine 384 may be used to communicate with a game server in order to request and receive a download of particular games. Further, the game engine 384 may be operable to capture metadata 386 associated with particular games. The game engine 384 may also be operable to transmit the metadata 386 to a game server and receive the leaderboard 382 from the game server. The leaderboard 382 may be created by the game server at least partially based on the metadata 386 received from one or wireless devices 320. In a particular aspect, the leaderboard 382, the game engine 384, and the metadata 386 may be stored in the memory 344 and may be accessible by the processors 324, 326.

As depicted in FIG. 3, the touchscreen display 332, the video port 338, the USB port 342, the camera 348, the first stereo speaker 354, the second stereo speaker 356, the microphone 360, the FM antenna 364, the stereo headphones 366, the RF switch 370, the RF antenna 372, the keypad 374, the mono headset 376, the vibrator 378, and the power supply 380 are external to the on-chip system 322.

In a particular aspect, one or more of the method operations described herein may be stored in the memory 344 as computer program instructions. These instructions may be executed by a processor 324, 326 in order to perform the methods described herein. Further, the processors, 324, 326, the memory 344, the instructions stored therein, or a combination thereof may serve as a means for performing one or more of the method operations described herein.

Figure 4:
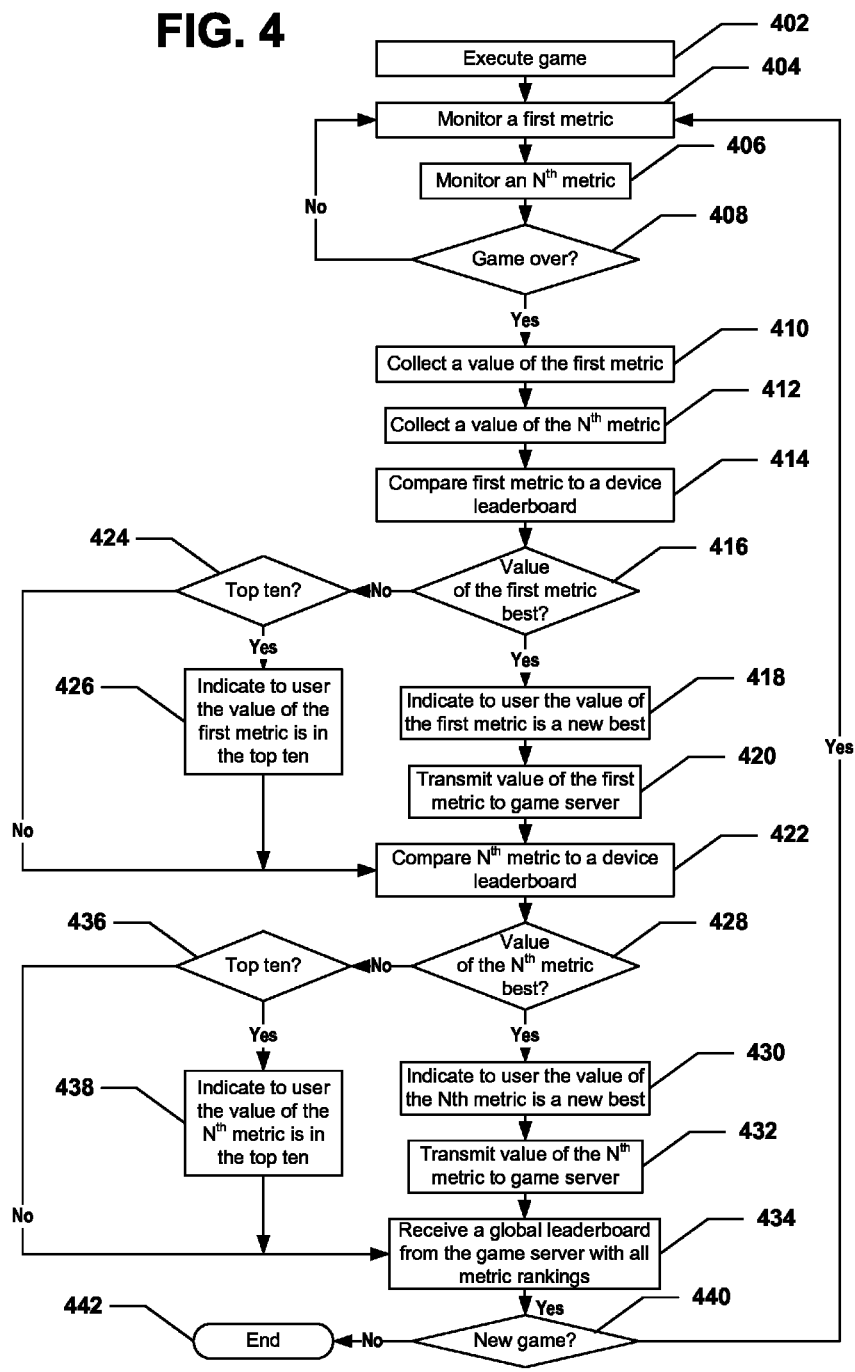
FIG. 4 is a flowchart illustrating a method of capturing metrics during a game, according to one aspect.

Referring to FIG. 4, a method of capturing metrics during a game is shown, according to one aspect, and commences at 402. Beginning at 402, a game is executed, or otherwise played at a user device. The user device can be a wireless device such as a mobile telephone, a laptop computer, a portable digital assistant, etc. Further, the user device can be a wired device such as a personal computer, a desktop computer, etc.

Moving to 404, a processor, or a program that is executable by the processor, within the user device can monitor a first metric. At 406, the processor can monitor an Nth metric. As such, the processor can monitor any number of metrics associated with the game. For example, the processor can monitor the score of the game, the time to complete a particular level, the time to finish a game, a character strength, a number of kills, a number of objectives achieved, an amount of money earned, any other metric associated with a game, or a combination thereof.

Continuing to 408, the processor can determine whether the game has ended. If so, the processor can collect, or otherwise store, a value of the first metric. Further, at 412, the processor can collect, or otherwise store, a value of the Nth metric. At 414, the processor can compare the first metric to a device leaderboard. The device leaderboard can indicate the high scores achieved by playing the game at the device in which the game has been downloaded, stored, and executed by a user. At 416, the processor can determine whether the value of the first metric is the best value, i.e., a high score. If so, at 418, the processor can indicate to the user that the value of the metric is a new best. At 420, the processor can then transmit the value of the first metric to a game server. Thereafter, the method can move to 422 and continue as described herein.

Returning to 416, if the value of the first metric is not the best value for that metric, the method can move to 424 and the processor can determine if the value of the first metric is within the top ten best values for the first metric. If so, the method can move to 426 and the processor can indicate to the user that the value of the first metric is in the top ten for that metric. On the other hand, if the value is not in the top ten for the first metric, the method can proceed to 422.

At 422, the processor can compare the Nth metric to the device leaderboard. At 428, the processor can determine whether the value of the Nth metric is the best value for the Nth metric, i.e., a high score. If so, at 430, the processor can indicate to the user that the value of the Nth metric is a new best. At 432, the processor can then transmit the value of the Nth metric to the game server. Thereafter, the method can move to 434 and continue as described herein.

Returning to 428, if the value of the Nth metric is not the best value for that metric, the method can move to 436 and the processor can determine if the value of the Nth metric is within the top ten best values for the Nth metric. If so, the method can move to 438 and the processor can indicate to the user that the value of the Nth metric is in the top ten for that metric. Conversely, if the value of the Nth metric is not in the top ten for the Nth metric, the method can continue to 434.

At 434, the user device can receive a global leaderboard from the game server. The new leaderboard can include all metric rankings for all user devices associated with a particular game provided by the game server. Alternatively, the global leaderboard can indicate the top ten for all user devices and include a ranking associated with the current user metric, or metrics, if it is not in the top. Accordingly, the user can see the top ten of all global users, or players, and if the user is not in the top ten, the user can see how his or her performance compares to the performances of the top ten users.

Moving to 440, the user device can determine whether a new game is initiated. If so, the method can return to 404 and continue as described herein. Otherwise, the method can end at 442.

Figure 5:
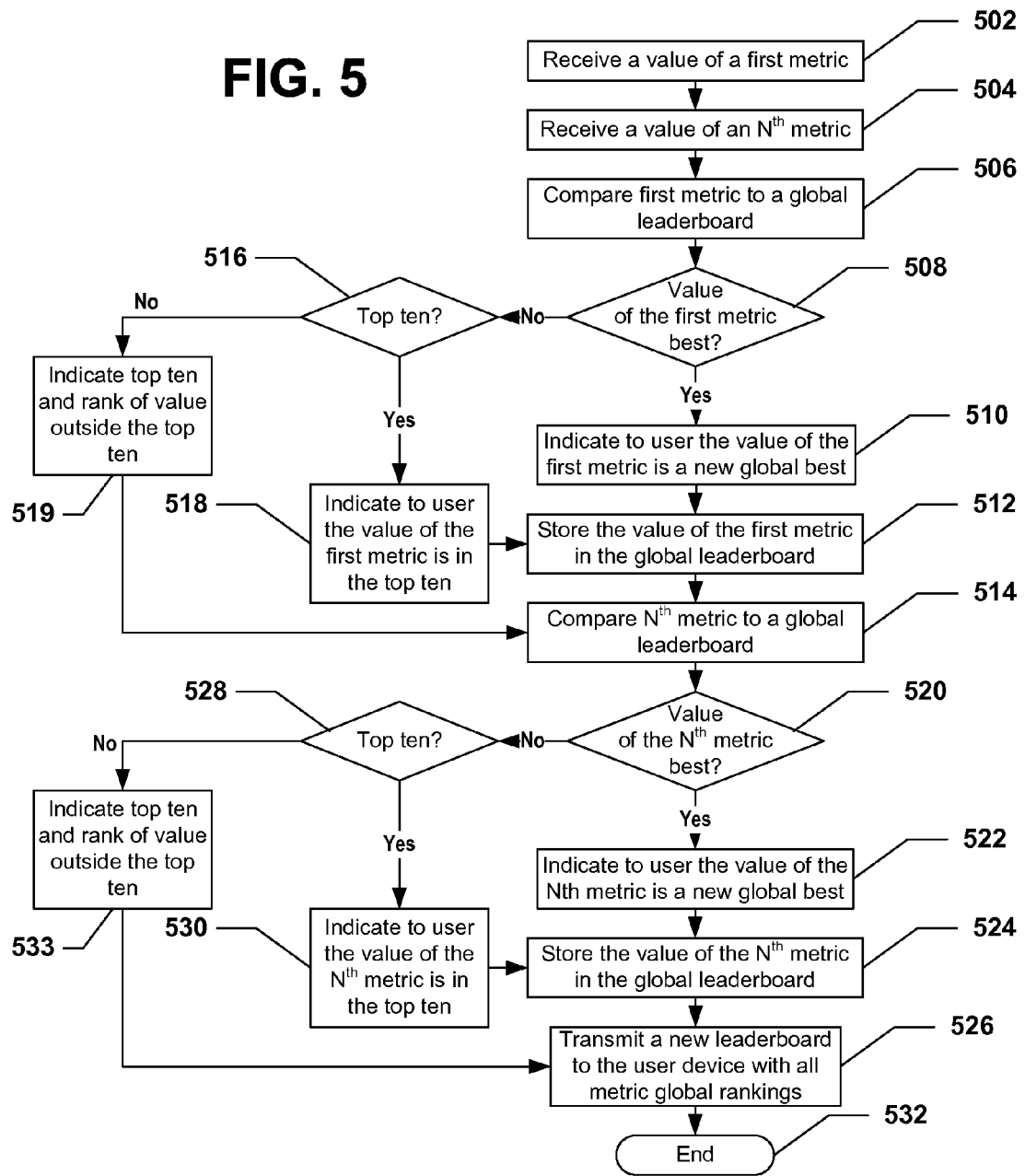
FIG. 5 is a flowchart illustrating a method of receiving user metrics at a game server, according to one aspect.

Referring now to FIG. 5, a method of receiving user metrics at a game server is shown, according to one aspect. Beginning at 502, a game server, e.g., a game server, can receive a value of a first metric from a user device. For example, the user device can include one or more games downloaded to the user device as software. The games can be executed at the user device and played by a user. During game play, one or more metrics, e.g., scores, etc., associated with the game can be captured by the user device and transmitted to the game server as described herein. At 504, the game server can receive a value of an Nth metric. The game server can receive any number of metrics. The metrics can include a game score, a time to complete a particular level, a time to finish a game, a character strength, a number of kills, a number of objectives achieved, an amount of money earned, any other metric associated with a game, or a combination thereof.

Further, at 506, the first metric can be compared to a global leaderboard that can be stored within a memory within the game server or within a database connected to the game server. Moving to 508, the game server can determine whether the value of the first metric is a best value for the first metric. If so, the method can move to 510 and the game server can indicate to the user that the value of the first metric is a new global best. Thereafter, at 512, the game server can store the value of the first metric in the global leaderboard. The method can then move to 514 and continue as described herein.

Returning to 508, if the value of the first metric is not a best value, the method can move to 516 and the game server can determine whether the value of the first metric is a top ten value. If so, the method can proceed to 518 and the game server can indicate to the user device that the value of the first metric is a top ten value. Then, the method can move to 512 and continue as describe herein. Returning to 516, if the value of the first metric is not a top ten value, the method can move to 519 and the game server can indicate the rank of the value of the first metric in addition to the top ten values. Thereafter, the method can move directly to 514.

At 514, the Nth metric can be compared to the global leaderboard. Moving to 520, the game server can determine whether the value of the Nth metric is a best value for the Nth metric. If so, the method can move to 522 and the game server can indicate to the user that the value of the Nth metric is a new global best. Thereafter, at 524, the game server can store the value of the Nth metric in the global leaderboard. The method can then move to 526 and continue as described herein.

Returning to 520, if the value of the Nth metric is not a best value, the method can move to 528 and the game server can determine whether the value of the Nth metric is a top ten value. If so, the method can proceed to 530 and the game server can indicate to the user device that the value of the Nth metric is a top ten value for the Nth metric. Then, the method can move to 524 and continue as describe herein. Returning to 528, if the value of the Nth metric is not a top ten value, the method can move to 533 and the game server can indicate the rank of the value of the Nth metric in addition to the top ten values. Thereafter, the method can move to 526. At 526, the game server can transmit a new leaderboard to the user device with all metric global rankings. Then, the method can end at state 532.

Figure 6:
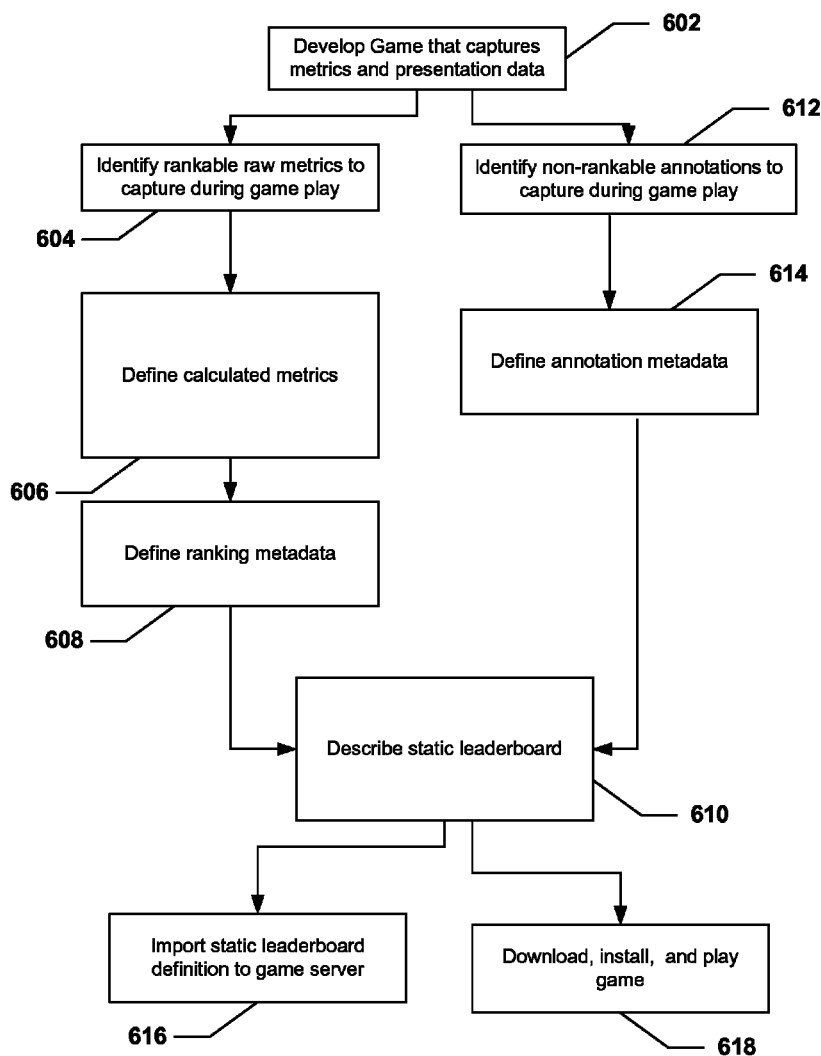
FIG. 6 is a flowchart illustrating a method of creating one or more static leaderboards, according to one aspect.

FIG. 6 illustrates a method of creating one or more static leaderboards, according to one aspect. Beginning at 602, a game that captures metrics and presentation data can be developed. At 604, rankable raw metrics that may be captured during game play may be identified. In one example, rankable raw metrics can be raw metrics 1-J. Further, at 606, calculated metrics can be defined. In one example, the calculated metrics can be J-N. The calculated metrics can be sourced from raw metrics and may be based on an algorithm created by the developer. The algorithm may be described using standard MathXML or standard mathematic symbols, i.e., +, −, *, /, or a combination thereof. Moving to 608, ranking metadata may be defined by the developer. The ranking metadata may include one or more correlation tags, one or more metric headings, one or more rank orders, or a combination thereof. The rank order may be high-to-low (H2L), low-to-high (L2H), any other appropriate ranking order, or a combination thereof. Thereafter, the method may move to 610 and continue as described herein.

Returning to 602, as the method moves to 604 and continues as described herein, the method may also move to 612. At 612, one or more non-rankable annotations, e.g., 1-M, to be captured during game play, may be identified. Moving to 614, annotation metadata may be defined. The annotation metadata may include one or more correlations tags, one or more metric headings, one or more rank orders, or a combination thereof. The rank order may be high-to-low (H2L), low-to-high (L2H), any other appropriate ranking order, or a combination thereof. From 614, the method may move to 610.

At 610, a static leaderboard may be described, e.g., using extensible markup language (XML). The static leaderboard may include document type definition (DTD), XML schema, or a combination thereof. Further, the static leaderboard may include a unique game identification (ID), layout data, tag to column mapping data, or a combination thereof. The layout data may include a column order. From 610, the method may move to 616 and to 618. At 616, the static leaderboard definition may be imported to a game server. At 618, a game associated with the static leaderboard may be downloaded to a wireless device, installed, and played, as described above in conjunction with FIG. 4.

Figure 7:
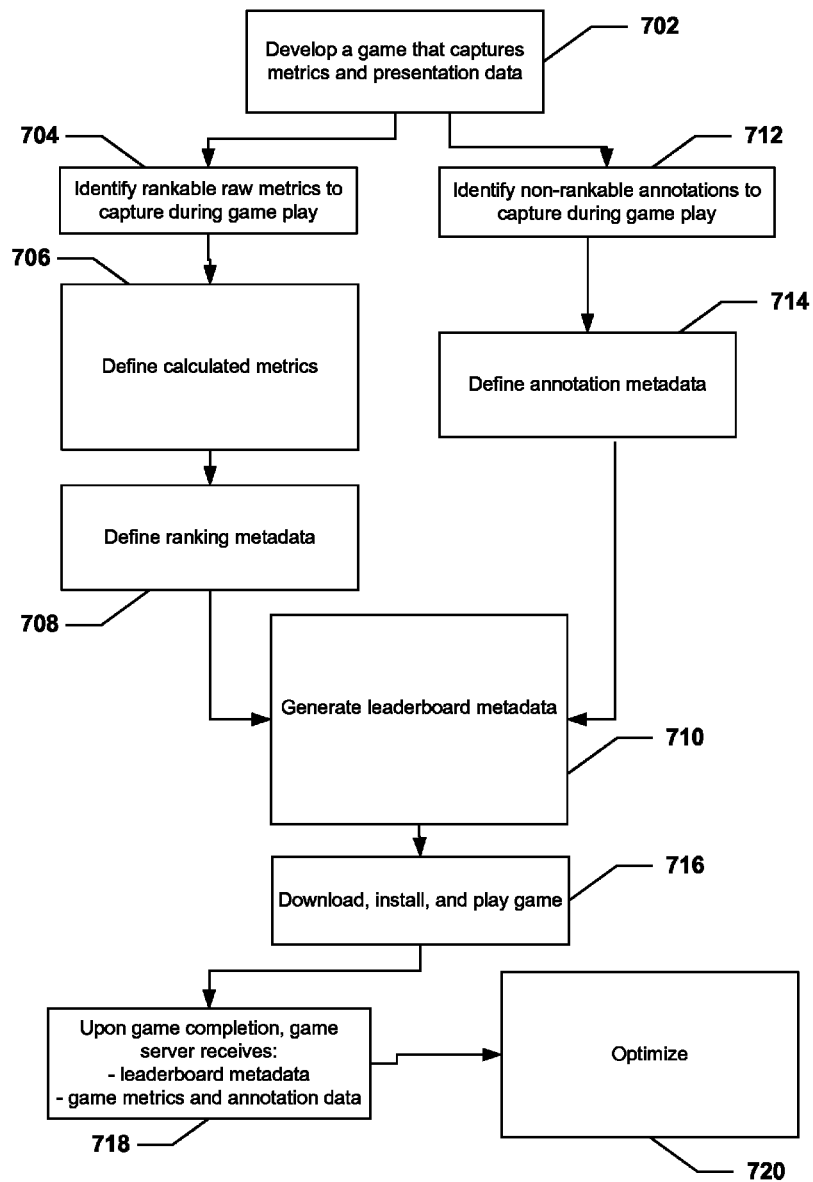
FIG. 7 is a flowchart illustrating a method of a method of creating one or more dynamic leaderboards, according to one aspect.

FIG. 7 illustrates a method of creating one or more dynamic leaderboards, in accordance with one aspect. Beginning at 702, a game that captures metrics and presentation data can be developed. At 704, rankable raw metrics, e.g., 1-J, that may be captured during game play may be identified. Further, at 706, calculated metrics, e.g., J-N, can be defined. The calculated metrics can be sourced from raw metrics and may be based on an algorithm created by the developer. The algorithm may be described using standard MathXML or standard mathematic symbols, i.e., +, −, *, /, or a combination thereof. Moving to 708, ranking metadata may be defined by the developer. The ranking metadata may include one or more correlation tags, one or more metric headings, one or more rank orders, or a combination thereof. The rank order may be high-to-low (H2L), low-to-high (L2H), any other appropriate ranking order, or a combination thereof. Thereafter, the method may move to 710 and continue as described herein.

Returning to 702, as the method moves to 704 and continues as described herein, the method may also move to 712. At 712, one or more non-rankable annotations, e.g., 1-M, to be captured during game play, may be identified. Moving to 714, annotation metadata may be defined. The annotation metadata may include one or more correlations tags, one or more metric headings, one or more rank orders, or a combination thereof. The rank order may be high-to-low (H2L), low-to-high (L2H), any other appropriate ranking order, or a combination thereof. From 714, the method may move to 710.

At 710, a dynamic leaderboard metadata may be generated. The dynamic leaderboard metadata may be encoded using document type definition (DTD), XML schema, or a combination thereof. Further, the dynamic leaderboard may include a unique game identification (ID), a game family ID, a leaderboard version, layout data, tag to column mapping data, or a combination thereof. The leaderboard version may be monotonically increasing. Further, the layout data may include column headings, a column order, or a combination thereof.

Moving to 716, game associated with the static leaderboard may be downloaded to a wireless device, installed, and played, as described above in conjunction with FIG. 4. At 718, upon game completion, a game server may receive leaderboard metadata, game metrics, annotation data, or a combination thereof from the wireless device at which the game is played. Thereafter, at 720, the game server may perform an optimization method. For example, after a game at a wireless device transmits its game play data with the dynamic leaderboard, subsequent transmissions to the wireless device may include the leaderboard version, game metrics, or a combination thereof.

Figure 8:
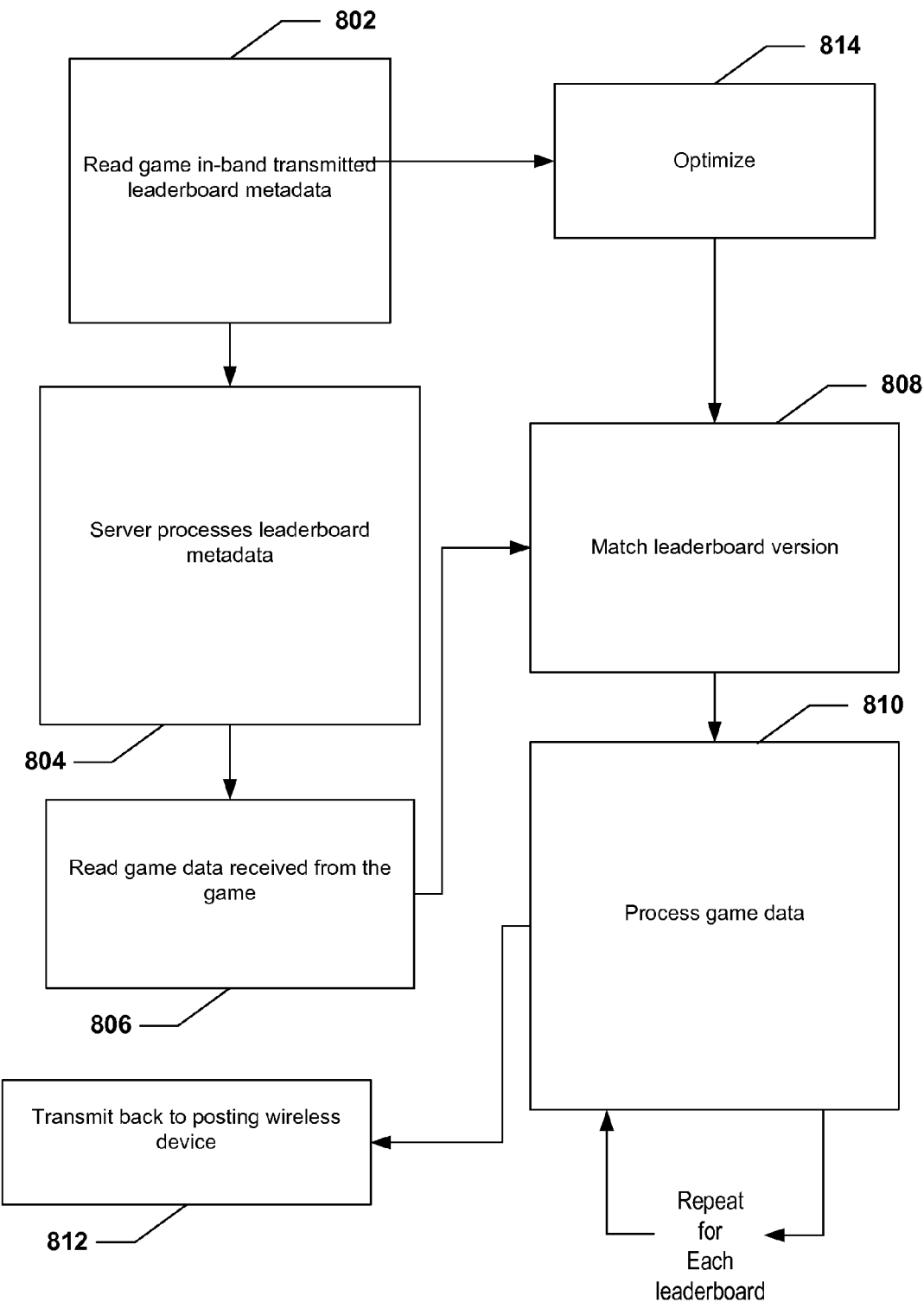
FIG. 8 is a flowchart illustrating a method of processing leaderboard metadata at a game server, according to one aspect.

Referring now to FIG. 8, a method of processing leaderboard metadata at a game server is shown, according to one aspect. At 802, the game server may read in-band transmitted game leaderboard metadata. The leaderboard metadata may be encoded using DTD, XMLSchema, or a combination thereof. Further, the leaderboard metadata may include, a unique game ID, a game family ID, a leaderboard version, layout data, or tag to column mapping data. The leaderboard version may be monotonically increasing. Moreover, the layout data may include column headings, a column order, or a combination thereof. At 804, the game server may process the leaderboard metadata. For example, the game server may check for valid XML and look up existing game ID/game family ID leaderboard schema. If the game ID/game family ID leaderboard schema is found, the game server may compare leaderboard versions, e.g., to find the most recent version. If the game ID/game family leaderboard schema is not found, the game server may persist with the current leaderboard schema as described herein. If the transmitted leaderboard is later, then the game server may persist with the new leaderboard schema as described herein. If the transmitted leaderboard is not later, then the game server may ignore it.

Moving to 806, the game server may read the game data received from the game. For example, the game server may use the leaderboard definition version to generate game data. The game data may include game play raw metrics, game play generated metrics, game play annotations, or a combination thereof. At 808, the game server, e.g., a leaderboard processor therein, may perform a leaderboard version match operation. For example, the game server may fetch current leaderboard definition from an encrypting file system (EFS). Thereafter, the game server may compare versions of leaderboard definitions. If the version is greater than the current version, an error can be indicated. If the version is less than the current version, the game server may fetch that version.

Continuing to 810, the game server, e.g., a leaderboard processor therein, may process game data. For example, the game server can read game data received from a wireless device, stored in a game server, or a combination thereof. The game server may validate the game data against a chosen leaderboard. The game server can indicate an error if the XML does not validate. Further, the game server may post raw metrics to a leaderboard database. The game server may also post calculate metrics to a leaderboard database. The game server may check for ranks of newly posted rank data. Moreover, the game server may post game play annotations. In a particular aspect, posted data may be correlated to the current game play by date, gamer ID, game ID, game family ID, or a combination thereof. The method operation of 810 may be repeated for each leaderboard.

At 812, the leaderboard may be transmitted back to a posting wireless device. The leaderboard may include the ranks of the posted metrics. Returning to 802, while performing operations 804 and 806, or in lieu thereof, the method may move to 814 where the game server can perform an optimization operation in which after the game transmits its game play data with the dynamic leaderboard, subsequent transmission may pass the current leaderboard version. Thereafter, the method may end.

It is to be understood that the method operations described herein do not necessarily have to be performed in the order as described. Further, words such as "thereafter," "then," "next," etc. are not intended to limit the order of the operations. These words are simply used to guide the reader through the description of the method operations.

One or more aspects described herein provide a leaderboard that can be used to list scores associated with a particular game. The leaderboard can be dynamic in that it can be updated as various users complete their games and the games report the values of one or more metrics to a central game server. The central game server can maintain several versions of a leaderboard and may provide a most recent version of the leaderboard to the one or more users of a particular distributed game. The most recent version can include the most up to date scores. Further, the leaderboard can be global in that all users of a particular distributed game report to the central game server which can create, or otherwise update, the leaderboard. The leaderboard can list top scores, e.g., top ten. Further, the leaderboard can list a particular user's ranking relative to the top ten scores—if that user is not in the top ten. As such, the user has a way to judge his or her performance with respect to other players of the same game.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations can be made therein without departing from the spirit and scope of the present teachings, as defined by the following claims.

APPENDIX 1

Exemplary, Non-limiting Leaderboard.

Leaderboard
  Name
  Order (H2L or L2H)
  Base Columns
    Rank - derived
    gamerID - poster's gamerID
    Main_Score - used to derive rank
  Extra columns
Column
  Name APPENDIX 1-continued Exemplary, Non-limiting Leaderboard.

Value
  Type (avg, cumulative, raw, text)
  Weight (default = 1)
Posting to a leaderboard now consists of a single post with a list of columns. The backend takes the columns, Game CLASSID, and gamerID and then determines which leaderboards are updated by the tag of the columns. This implies that column tag is unique.
API:
GameResultObj->AddScore("Main_Score", 500);
GameResultObj->AddScore("LevelAch", "13: Lucky Ville");
GameResultObj->AddScore("Weapon_Acquired", 12);
GameResultObj->AddScore("Accuracy_Percent", 98);
GameResultObj->AddScore("Orcs_Killed", 12);
GameResultObj->AddScore("Cows_Killed", 55);
GameResultObj->AddScore("Chubacas_Killed", 5);
PostResult(GameResultObj);
XML Definition of Leaderboards:
<Leaderboard Name="Doom" Order="H2L">
  <Column Name="Rank" Tag="Rank" Type="raw"/>
  <Column Name="Gamer ID" Tag="gamerID" Type="raw"/>
  <Column Name="Score" Tag="Main_Score" Type="raw"/>
  <Column Name="Level" Tag=" LevelAch" Type="text"/>
  <Column Name="Shot Accuracy" Tag=" Accuracy_Percent" Type="avg"/>
</Leaderboard>
<Leaderboard Name="Doom - Kills" Order="H2L">
  <Column Name="Rank" Tag="Rank" Type="raw"/>
  <Column Name="Gamer ID" Tag="gamerID" Type="raw"/>
  <Column Name="Level" Tag=" LevelAch" Type="text"/>
  <Column Name="Kill Meter" Type="calc" calc-name="kills-calc"/>
  <Column Name="Cows" Tag="Cows_killed" Type="cumm"/>
  <Column Name="Orcs" Tag=" Orcs_killed" Type="cumm"/>
  <Column Name="Chubacas" Tag=" Chubaca_killed" Type="cumm"/>
</Leaderboard>
<Calc Name="kills-calc"
  <Mult=Tag="Orcs_killed" Weight="10"/>
  <Add>
  <Mult=Tag="Cows_killed" Weight=".5"/>
  <Add>
  <Mult=Tag="Chubacas_killed" Weight="15"/>
</Calc>

What is claimed is:

1. A method of receiving a leaderboard associated with a software game provided by a game server executed at a wireless device, the method comprising:

monitoring, by the wireless device, a plurality of metrics associated with the software game while the software game is played;

collecting, by the wireless device, a value for each of the plurality of metrics when the software game is over;

comparing, by the wireless device, the value of each of the plurality of metrics to a device leaderboard;

displaying, by the wireless device, the value of at least a first metric of the plurality of metrics based on the value of the first metric being above a threshold value for the first metric but below a best value for the first metric above which there are no other values for the first metric when compared to the device leaderboard, wherein the value of the first metric is added to the device leaderboard only based on the value of the first metric being greater than the best value for the first metric;

transmitting, by the wireless device over a wireless network, the value of at least a second metric of the plurality of metrics to the game server based on the value of the second metric of the plurality of metrics being a best value for the second metric above which there are no other values for the second metric when compared to the device leaderboard; and receiving, at the wireless device over the wireless network, a global leaderboard from the game server, wherein the global leaderboard indicates to a user of the wireless device a ranking of scores achieved by a plurality of global users playing the software game.

2. The method of claim 1, wherein the device leaderboard indicates a ranking of scores achieved by playing the software game at the wireless device in which the software game is executed.

3. The method of claim 1, wherein the global leaderboard indicates a top ten ranking of scores received from a plurality of global users playing the software game provided by the game server.

4. The method of claim 3, wherein the global leaderboard further indicates a ranking of the best value for the second metric received from the wireless device when the best value for the second metric received from the wireless device is not in the top ten ranking of scores.

5. The method of claim 1, wherein the plurality of metrics is selected from a group comprising a game score, a time to complete a level, a time to finish the software game, a character strength, a number of kills, a number of objectives achieved, an amount of money earned, or a combination thereof.

6. The method of claim 1, further comprising:
transmitting, by the wireless device over the wireless network, leaderboard metadata including a unique game identification, a game family identification, and layout data in a first transmission to the game server; and
transmitting, by the wireless device over the wireless network, leaderboard metadata including a leaderboard version number in subsequent transmissions to the game server.

7. The method of claim 1, wherein the first metric is a different type of metric than the second metric.

8. The method of claim 1, wherein the threshold value comprises a tenth best value of the second metric.

9. A wireless device for receiving a leaderboard associated with a software game provided by a game server executed at the wireless device, comprising:
means for monitoring a plurality of metrics associated with the software game while the software game is played;
means for collecting a value for each of the plurality of metrics when the software game is over;
means for comparing the value of each of the plurality of metrics to a device leaderboard;
means for displaying the value of at least a first metric of the plurality of metrics based on the value of the first metric being above a threshold value for the first metric but below a best value for the first metric above which there are no other values for the first metric when compared to the device leaderboard, wherein the value of the first metric is added to the device leaderboard only based on the value of the first metric being greater than the best value for the first metric;
means for transmitting the value of at least a second metric of the plurality of metrics over a wireless network to the game server based on the value of the second metric of the plurality of metrics being a best value for the second metric above which there are no other values for the second metric when compared to the device leaderboard; and
means for receiving, over the wireless network, a global leaderboard from the game server, wherein the global leaderboard indicates to a user of the wireless device a ranking of scores achieved by a plurality of global users playing the software game.

10. The wireless device of claim 9, wherein the device leaderboard indicates a ranking of scores achieved by playing the software game at the wireless device in which the software game is executed.

11. The wireless device of claim 9, wherein the global leaderboard indicates a top ten ranking of scores received from a plurality of global users playing the software game provided by the game server.

12. The wireless device of claim 11, wherein the global leaderboard further indicates a ranking of the best value for the second metric received from the wireless device when the best value for the second metric received from the wireless device is not in the top ten ranking of scores.

13. The wireless device of claim 9, wherein the plurality of metrics is selected from a group comprising a game score, a time to complete a level, a time to finish the software game, a character strength, a number of kills, a number of objectives achieved, an amount of money earned, or a combination thereof.

14. A wireless device for receiving a leaderboard associated with a software game provided by a game server executed at the wireless device, the wireless device comprising:
a processor, wherein the processor is configured to:
monitor a plurality of metrics associated with the software game while the software game is played;
collect a value for each of the plurality of metrics when the software game is over;
compare the value of each of the plurality of metrics to a device leaderboard;
cause a user interface of the wireless device to display the value of at least a first metric of the plurality of metrics based on the value of the first metric being above a threshold value for the first metric but below a best value for the first metric above which there are no other values for the first metric when compared to the device leaderboard, wherein the value of the first metric is added to the device leaderboard only based on the value of the first metric being greater than the best value for the first metric;
cause a transmitter of the wireless device to transmit the value of at least a second metric of the plurality of metrics over a wireless network to the game server based on the value of the second metric of the plurality of metrics being a best value above which there are no other values for the second metric when compared to the device leaderboard; and
cause a receiver of the wireless device to receive, over the wireless network, a global leaderboard from the game server, wherein the global leaderboard indicates to a user of the wireless device a ranking of scores achieved by a plurality of global users playing the software game.

15. The wireless device of claim 14, wherein the device leaderboard indicates a ranking of scores achieved by playing the software game at the wireless device in which the software game is executed.

16. The wireless device of claim 14, wherein the global leaderboard indicates a top ten ranking of scores received from a plurality of global users playing the software game provided by the game server.

17. The wireless device of claim 16, wherein the global leaderboard further indicates a ranking of the best value for the second metric received from the wireless device when the best value for the second metric received from the wireless device is not in the top ten ranking of scores.

18. The wireless device of claim 14, wherein the plurality of metrics is selected from a group comprising a game score, a time to complete a level, a time to finish the software game, a character strength, a number of kills, a number of objectives achieved, an amount of money earned, or a combination thereof.

19. A non-transitory computer-readable medium, comprising:
- at least one instruction for causing a computer to monitor a plurality of metrics associated with a software game provided by a game server while the software game is played;
- at least one instruction for causing the computer to collect a value for each of the plurality of metrics when the software game is over;
- at least one instruction for causing the computer to compare the value of each of the plurality of metrics to a device leaderboard;
- at least one instruction for causing the computer to display the value of at least a first metric of the plurality of metrics based on the value of the first metric being above a threshold value for the first metric but below a best value for the first metric above which there are no other values for the first metric when compared to the device leaderboard, wherein the value of the first metric is added to the device leaderboard only based on the value of the first metric being greater than the best value for the first metric;
- at least one instruction for causing the computer to transmit the value of at least a second metric of the plurality of metrics over a wireless network to the game server based on the value of the second metric of the plurality of metrics being a best value above which there are no other values for the second metric when compared to the device leaderboard; and
- at least one instruction for causing the computer to receive, over the wireless network, a global leaderboard from the game server, wherein the global leaderboard indicates to a user of the computer a ranking of scores achieved by a plurality of global users playing the software game.

20. The non-transitory computer-readable medium of claim 19, wherein the device leaderboard indicates a ranking of scores achieved by playing the software game at the computer in which the software game is executed.

21. The non-transitory computer-readable medium of claim 19, wherein the global leaderboard indicates a top ten ranking of scores received from a plurality of global users playing the software game provided by the game server.

22. The non-transitory computer-readable medium of claim 21, wherein the global leaderboard further indicates a ranking of the best value for the second metric received from the computer when the best value for the second metric received from the computer is not in the top ten ranking of scores.

23. The non-transitory computer-readable medium of claim 19, wherein the plurality of metrics is selected from a group comprising a game score, a time to complete a level, a time to finish the software game, a character strength, a number of kills, a number of objectives achieved, an amount of money earned, or a combination thereof.

* * * * *